US012808783B2

(12) United States Patent
Chism, II

(10) Patent No.: US 12,808,783 B2
(45) Date of Patent: Nov. 24, 2026

(54) SYSTEMS AND METHODS FOR PHOTOREFLECTANCE SPECTROSCOPY USING PARALLEL DEMODULATION

(71) Applicant: William W. Chism, II, Austin, TX (US)

(72) Inventor: William W. Chism, II, Austin, TX (US)

( * ) Notice: Subject to any disclaimer, the term of this patent is extended or adjusted under 35 U.S.C. 154(b) by 10 days.

(21) Appl. No.: 17/877,927

(22) Filed: Jul. 30, 2022

(65) Prior Publication Data

US 2023/0084219 A1 Mar. 16, 2023

Related U.S. Application Data

(60) Provisional application No. 63/360,159, filed on Sep. 13, 2021.

(51) Int. Cl.
*G01N 21/17* (2006.01)
*G01N 21/31* (2006.01)
(Continued)

(52) U.S. Cl.
CPC ......... *G01N 21/1717* (2013.01); *G01N 21/31* (2013.01); *G01N 21/55* (2013.01);
(Continued)

(58) Field of Classification Search
CPC ........... G01N 21/9501; G01N 21/1717; G01N 21/31; G01N 21/8806; G01N 2021/1725
See application file for complete search history.

(56) References Cited

U.S. PATENT DOCUMENTS 7,060,957 B2 6/2006 Lange et al.
7,239,390 B2 7/2007 Smith
(Continued)

OTHER PUBLICATIONS

Davis, A.R., Pye, L.N., Katz, N., Hudgings, J.A. and Carter, K.R. (2014), Spatially Mapping Charge Carrier Density and Defects in Organic Electronics Using Modulation-Amplified Reflectance Spectroscopy. Adv. Mater., 26: 4539-4545. https://doi.org/10.1002/adma.201400859 (Year: 2014).*
(Continued)

*Primary Examiner* — Michael P LaPage
(74) *Attorney, Agent, or Firm* — The Langley Law Firm, P.C.

(57) ABSTRACT

A rapid photoreflectance spectroscopy technique using parallel demodulation has been developed. A high-speed spectroscopic photo-reflectometer comprising an intensity modulated pump laser beam to modulate the reflectivity of a semiconductor sample and a second spectroscopic probe light beam to measure the modulated reflectance of the sample is disclosed. The modulated pump beam is focused onto the sample where it interacts with the sample. The spectroscopic probe beam is focused onto the sample where it is reflected. The reflected probe beam is collected and its constituent wavelengths are dispersed onto a compact photosensor array further comprising a parallel demodulation circuit for each photosensor element. Demodulated signals may then be passed to a computer for recordation and/or further analysis. A fit to the data may then be performed using standard nonlinear regression techniques, thereby providing rapid characterization of the sample material and/or electronic properties.

15 Claims, 2 Drawing Sheets

(51) Int. Cl.
*G01N 21/55* (2014.01)
*G01N 21/88* (2006.01)
*G01N 21/95* (2006.01)

(52) U.S. Cl.
CPC ..... *G01N 21/8806* (2013.01); *G01N 21/9501* (2013.01); *G01N 21/9505* (2013.01); *G01N 2021/1725* (2013.01); *G01N 2201/06113* (2013.01)

(56) References Cited

U.S. PATENT DOCUMENTS

| | | | | |
|---|---|---|---|---|
| 7,550,705 | B2 | 6/2009 | Seitz et al. | |
| 7,595,476 | B2 | 9/2009 | Beer et al. | |
| 9,640,449 | B2 | 5/2017 | Goodwin et al. | |
| 2006/0094133 | A1* | 5/2006 | Takeuchi | G01N 21/6489 438/14 |
| 2006/0215175 | A1* | 9/2006 | Yacoubian | G01N 21/9505 356/502 |
| 2007/0252988 | A1 | 11/2007 | Levy | |
| 2010/0051786 | A1 | 3/2010 | Lotto et al. | |
| 2016/0131594 | A1* | 5/2016 | Koldiaev | G01N 21/9501 702/172 |
| 2020/0322561 | A1* | 10/2020 | Verdant | G01S 17/89 |
| 2023/0035404 | A1* | 2/2023 | Oren | G03F 7/70625 |

OTHER PUBLICATIONS

Roger A. Light, Richard J. Smith, Nicholas S. Johnston, Michael G. Somekh, and Mark C. Pitter "CMOS lock-in optical sensor for parallel detection in pump-probe systems", Proc. SPIE 8073, Optical Sensors 2011; and Photonic Crystal Fibers V, 807304 (May 6, 2011), https://doi.org/10.1117/12.886892 (Year: 2011).*

J. Misiewicz et al., "Photoreflectance spectroscopy applied to semiconductors and semiconductor heterostructures," Optica Applicata 29, 327-363 (1999).

R. Ditchfield et al., "Semiconductor surface diffusion: Nonthermal effects of photon illumination," Phys. Rev. B 61, 13710-13720 (2000).

J. Behn et al., "Optimization of the signal-to-noise ratio for photoreflectance spectroscopy," J. Appl. Phys. 90, 5081-5085 (2001).

J. Behn et al., "Relation between photoreflectance excitation and absorption spectra for GaAs and GaN films," J. Appl. Phys. 93, 221-225 (2003).

J. Munguia et al., "Optical strain measurement in ultrathin sSOI wafer," Nucl. Instr. and Meth. in Phys. Res. B 253, 18-21 (2006).

H. Chouaib et al., "Rapid photoreflectance spectroscopy for strained silicon metrology," Rev. Sci. Inst. 79, 103106 (2008).

J. Munguia et al., "UV photoreflectance spectroscopy in strained silicon on insulator structures," Phys. Status Solidi A 206, 821-825 (2009).

"White Paper: Principles of lock-in detection and the state of the art," Zurich Instruments, Nov. 2016, 10 pages.

A.M. Wojciechowski et al., "Camera-limits for wide-field magnetic resonance imaging of a nitrogen-vacancy spin sensor," arXiv preprint arXiv:1708.06317v1 (2017).

G.A. Stimpson et al., "An open-source high-frequency lock-in amplifier," Rev. Sci. Inst. 90, 094701 (2019).

R. Kudrawiec and W. Walukiewicz, "Electromodulation spectroscopy of highly mismatched alloys," J. Appl. Phys. 126, 141102 (2019).

D. Aspnes, "The dielectric function of semiconductors," in Handbook on Semiconductors, vol. 2, edited by T.S. Moss, pp. 111-154 (North-Holland, Amsterdam, 1980).

H. Shen et al., "Photoreflectance study of surface Fermi level in GaAs and GaAlAs," Appl. Phys. Lett. 57, 2118-2120 (1990).

H. Shen et al., "Dynamics of photoreflectance from undoped GaAs," Appl. Phys. Lett. 59, 321-323 (1991).

R. Kudraweic et al., "Three beam photo-reflectance as a powerful method to investigate semiconductor heterostructures," Thin Solid Films 450, 71-74 (2004).

"Declaration of David E. Aspnes," Exhibit B to Defendant KLA-Tencor Corporation's Opposition to Xitronix's Motion for Partial Summary Judgment of Invalidity, filed Oct. 16, 2009 in Case No. 1:08-cv-00723-SS in the U.S. District Court for the Western District of Texas, Austin Division.

* cited by examiner

SYSTEMS AND METHODS FOR PHOTOREFLECTANCE SPECTROSCOPY USING PARALLEL DEMODULATION

CROSS-REFERENCE TO RELATED PATENT APPLICATIONS

This application claims benefit of priority of U.S. Provisional Application Ser. No. 63/360,159, filed on Sep. 13, 2021, and which is incorporated herein by reference in its entirety.

BACKGROUND

Field of the Invention

The present invention relates to modulation spectroscopy and, more particularly, to photoreflectance spectroscopy using parallel demodulation.

Background of the Invention

Since its inception in 1964, modulation spectroscopy has been a particularly important tool for semiconductor characterization. Photo-modulated reflectance, or "photoreflectance," is a convenient form of modulation spectroscopy effective for the non-contact evaluation of material and electronic properties of semiconductors. Photoreflectance generally involves the use of an intensity modulated light beam to perturb the reflectance of a sample and has variously been referred to as "modulated photo-reflectance," "modulated optical reflectance," and "photo-modulated optical reflectance." The technique has been used to determine electronic band structures, internal electric fields, and other semiconductor properties such as crystallinity, composition, physical strain, and doping concentration [J. Misiewicz et al., "Photoreflectance spectroscopy applied to semiconductors and semiconductor heterostructures," Optica Applicata 29, 327-363 (1999). ("Misiewicz 1999")].

Conventional photoreflectance utilizes an intensity modulated pump laser beam to modulate the free charge density in the sample (i.e., via photo-injection), thereby modulating the sample's internal electric field [R. Kudrawiec and W. Walukiewicz, "Electromodulation spectroscopy of highly mismatched alloys," J. Appl. Phys. 126, 141102 (2019). ("Kudrawiec 2019")]. This modulated photovoltage produces changes in the reflectance of the sample at wavelengths nearby the interband transitions of materials within the sample. A second probe light beam is then used to measure the reflectance of the sample as a function of wavelength. The measurement signal (at each wavelength) is the change in intensity of the reflected probe light as the intensity modulated pump radiation interacts with the sample and consists of a vector characterized by an amplitude and a phase. The normalized amplitude is the AC induced change in reflectance divided by the linear DC reflectance, whereas the phase quantifies the relative lag of the reflectance change with respect to the driving phase (i.e., due to the non-instantaneous relaxation dynamics of the photo-injected carriers within the sample). Even at parts of the spectrum where it is appreciable, the AC reflectance is small with respect to the DC reflectance. However, since the induced change in reflectance occurs at a known frequency, phase-locked detection techniques may be used to extract the photoreflectance signal from the noise.

In the conventional photoreflectance setup, light from a xenon or tungsten discharge lamp is passed through a monochromator to form the incident probe beam. The monochromatic probe beam is reflected from the sample and detected by a one-channel detector such as a photodiode. The monochromator selects the probe beam wavelength such that the signal may be recorded serially by the one-channel detector as a function of wavelength. A nonlinear regression analysis is then used to adjust the parameters within a well-known functional form to provide an optimum fit to the spectroscopic photoreflectance data and to thereby determine semiconductor interband transition energies, amplitudes, widths, etc. The nonlinear regression analysis outputs the best-fit parameters, a statistical estimate of the error in the output parameters, and an overall "goodness-of-fit" measure, as needed. The error estimates generally depend upon (i) the measurement uncertainties at each data point, (ii) the number and spacing of the data points, and (iii) the match of the analytic model to the data. This analysis can provide an essentially complete characterization of the material and/or electronic properties of a particular semiconductor structure. However, the need for spectroscopic information in combination with the practical necessity for phase-locked detection limits the measurement speed, consequently limiting the use of photoreflectance spectroscopy in industrial applications such as process control of semiconductor manufacturing.

Attempts to increase the speed of photoreflectance spectroscopy have been made by means of first illuminating the sample with a spectroscopic probe beam, then, after reflection from the sample, dispersing the constituent reflected probe beam wavelengths onto a photosensor array such that spectroscopic photoreflectance data may be transduced in parallel. A remote processor then "multiplexes" the output from each photosensor to achieve a simple background subtraction [H. Chouaib et al., "Rapid photoreflectance spectroscopy for strained silicon metrology," Rev. Sci. Inst. 79, 103106 (2008); U.S. Pat. No. 9,640,449 issued May 2, 2017, to Goodwin et al.]. However, such approaches have rather poor sensitivities, and thus are ineffective for multi-channel detection of photoreflectance signals (see, e.g., Kudrawiec 2019).

As may be appreciated, when multiple small signals are to be measured simultaneously, such as, for example, the parallel acquisition of spectroscopic photoreflectance signals from a reflected probe beam dispersed onto a photosensor array, then in general the same number of phase locked detection circuits are required. Furthermore with respect to photoreflectance in particular, since the photo-injected carriers will always reduce the latent voltage, illumination with a spectroscopic probe can lead to undesirable band flattening (see e.g., U. Behn et al. "Optimization of the signal-to-noise ratio for photoreflectance spectroscopy," J. Appl. Phys. 90, 5081-5085 (2001)).

Thus, while conventional photo-reflectometers may be suitable for analytic applications, they remain unsuitable for the high-speed characterization of the material and/or electronic properties of semiconductors as required in industrial applications.

SUMMARY OF THE INVENTION

The systems and methods of the invention generally involve photoreflectance spectroscopy using parallel demodulation. A primary object of the invention is to enable rapid characterization of the material and/or electronic properties of semiconductors in an industrial environment.

In one embodiment, the invention comprises a high-speed spectroscopic photo-reflectometer comprising, inter alia, a compact photosensor array, said array further comprising a parallel demodulation circuit for each photosensor element. The spectroscopic photo-reflectometer comprises an intensity modulated pump laser beam to modulate the reflectivity of a sample, and a second spectroscopic probe light beam to measure the modulated reflectance of the sample. The pump beam intensity may be modulated directly or through conventional external modulation means. The pump beam is focused onto the sample where it interacts with the sample. The spectroscopic probe beam is focused onto the sample where it is reflected. The reflected probe beam is collected and its constituent wavelengths are dispersed onto a compact photosensor array comprising a parallel demodulation circuit for each photosensor element.

The principle of lock-in detection is known in the art. Lock-in amplifiers operate by multiplying the input with a reference signal ("mixing") and then applying a low-pass filter to the result. Such demodulation isolates the signal at the frequency of interest from all other frequency components (i.e., within a narrow bandwidth set by the lock-in amplifier's "time constant"). As such, lock-in amplifiers can measure the amplitude and the phase of a signal relative to a defined reference signal, even if the signal is entirely buried in noise. Lock-in detection is a practical necessity in photoreflectance spectroscopy due to the small size of the experimental signals (in some cases ~ppm) and the unique ability of such means to reject noise outside a narrow bandwidth centered on the modulation frequency.

In an exemplary embodiment, the invention comprises the use of a CMOS-based lock-in camera as a compact photosensor array in a spectroscopic photoreflectance system. Lock-in cameras generally comprise an array of amplitude- and phase-sensitive demodulation pixels (i.e., having a demodulation circuit for each photosensor element). The photoreflectance signal at each pixel is sampled at a rate sufficient for determination of the signal envelope amplitude and phase. The demodulation circuit further comprises mixing and filter stages, and a read-out stage. Each demodulation circuit operates in parallel such that spectroscopic photoreflectance data is read out simultaneously. A fit to the output data may then be performed using standard nonlinear regression techniques, thus providing rapid characterization of the material and/or electronic properties of the sample.

There has thus been outlined, rather broadly, certain features of certain embodiments in order that the detailed description thereof may be better understood, and in order that the present contribution to the art may be better appreciated. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. It is also to be understood that the phraseology and terminology employed herein are for the purpose of the description and should not be regarded as limiting.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

The following discusses embodiments of systems and methods of photoreflectance spectroscopy using parallel demodulation for the rapid characterization of the material and/or electronic properties of semiconductor structures. The specific embodiments discussed herein are merely illustrative of specific ways to make and/or use the invention and are not intended to limit the scope of the claims.

Figure 1:
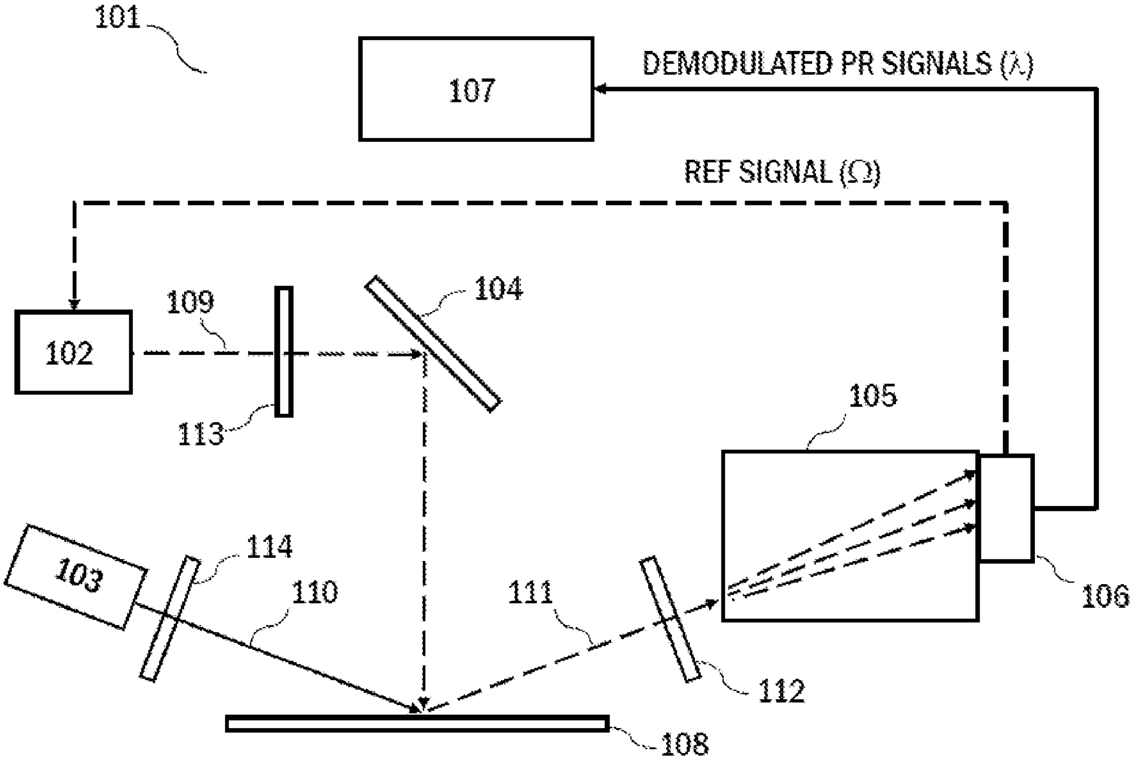
FIG. 1 contains a schematic arrangement of a spectroscopic photo-reflectometer that may be used to provide photoreflectance spectroscopy using parallel demodulation in accordance with certain embodiments of the present invention.

Turning now descriptively to the drawings, FIG. 1 contains an exemplary schematic arrangement of a spectroscopic photo-reflectometer 101 which may be used to provide photoreflectance spectroscopy using parallel demodulation. As shown in FIG. 1, said photo-reflectometer arrangement 101 comprises a pump laser source 102, a broad-spectrum probe light source 103, a dichroic mirror 104 (optionally), a wavelength dispersing spectrometer 105, a lock-in camera 106, and a computer 107. The pump laser source 102 is a semiconductor laser diode with photon energy at or above the band gap of semiconductor material within a sample 108. In an exemplary embodiment, the pump laser intensity is directly modulated using a reference signal from the lock-in camera 106. The pump laser source 102 may also be modulated via a signal from an external signal generator (not shown) with a suitable reference signal supplied to the lock-in camera 106, or the pump laser beam 109 may be modulated using an optical chopper or other conventional optical means (again, with a suitable reference signal supplied to the lock-in camera 106). The spectroscopic probe light beam 110 may be formed from a conventional lamp output or from a laser driven light source (such as, for example, the "Energetiq EQ-99X LDLS™"). The pump and probe beams (109 and 110, respectively) are projected onto the sample 108 and the reflected probe beam 111 is collected and transmitted to the wavelength dispersing spectrometer 105. Once the probe light is reflected from the sample 108 surface, it has a small amplitude modulation arising from the pump induced modulation of sample reflectivity. Scattered light from the pump beam 109 and/or any photo-luminescence signal is spectrally filtered using suitable wavelength filters 112 (e.g., notch and/or other color filters) and the reflected probe beam 111 is transmitted to the spectrometer 105. (As may be appreciated, any attendant photo-luminescence signal may be transmitted through the dichroic mirror 104 and imaged or otherwise analyzed in accord with techniques known in the art.) The intensity of the incident pump beam 109 may be controlled via a neutral density filter 113 fixtured in the input beam path. Likewise, in order to minimize unwanted band-flattening from the broad-spectrum probe light, suitable edge filters 114 (or the like) may be fixtured in the input probe beam 110 path. The spectrometer 105 disperses the reflected probe light into its constituent wavelengths and projects these wavelengths onto the lock-in camera 106 fixtured at the spectrometer exit. Each pixel of the lock-in camera 106 produces an electrical signal corresponding to the reflected probe light intensity (at the wavelength corresponding to the pixel position). The lock-in camera 106 further comprises a demodulation circuit for each photosensor element. Each demodulation circuit outputs a signal corresponding to the mixed and low-pass filtered photoreflectance signal (i.e., phase and/or amplitude) at the wavelength corresponding to the photosensor position.

In an exemplary embodiment, the invention comprises a CMOS-based lock-in camera. CMOS lock-in cameras perform on-pixel lock-in detection by transferring the charge accumulated on a pixel sequentially between four wells (capacitors), with the cycle period matching the applied modulation frequency. In particular, the voltage measured across the first and third well represents an "in-phase" signal, whereas the voltage measured across the second and fourth well represents a "quadrature" signal. Low-pass filtering is performed by accumulating the charges over many modulation periods before reading out the pixel value. In one embodiment the lock-in camera comprises the "heliCam™ C3.1.1-CP-ML1" available from Heliotis AG. The lock-in feature of this camera provides a sensitivity improvement of up to two orders of magnitude over the equivalent non-lock-in full well capacity, resulting in sensitivities ~$10^{-5}$ (thus enabling multichannel detection of photoreflectance signals ~$10^{-5}$ or greater). Other embodiments include any compact array of photosensor elements functional for detecting the dispersed probe light beam and further comprising a demodulation circuit for each photosensor element such as described in U.S. Pat. No. 7,595,476 issued Sep. 29, 2009, to Beer et al. (which is incorporated herein by reference in its entirety).

Alternatively, the spectrometer 105 may disperse the reflected probe light into its constituent wavelengths and project these wavelengths onto a photosensor array (such as a linear photodiode array or an avalanche photodiode array) fixtured at the spectrometer exit. In this case the modulated output signals (voltage or current) from the photosensor array may be passed to a multichannel lock-in amplifier, which measures the output signals. (The reference signal may be generated by the lock-in amplifier or an external signal generator, as is known in the art.) The measured signals are then transmitted to the computer 107, for recordation and/or further analysis.

A computer program residing on the computer 107 may also be used to evaluate the material and/or electronic properties of the sample 108. For example, in order to provide an optimum fit to the spectroscopic photoreflectance data (and to thereby evaluate the material and/or electronic properties of the sample), a nonlinear regression analysis may be used to adjust the variables within a nonlinear equation of the form $\Delta R/R=\mathrm{Re}[Ae^{i\theta}/(E-E_o+i\Gamma)^m]$, where A and θ are amplitude and phase factors, respectively, E is the photon energy, $E_o$ is the interband transition energy, Γ is the transition width, and m depends on the dimensionality of the density of states (see, e.g., Misiewicz 1999). It is to be appreciated the fit procedure is performed by a computer program, embodied on a non-transitory computer readable medium (including any medium that facilitates transfer of a computer program from one location to another), comprising executable code effective to receive spectroscopic photoreflectance data, initial guesses for variable parameters, to perform the nonlinear regression analysis, and to output the best-fit parameters, a statistical estimate of the error in the output parameters, and an overall "goodness-of-fit" measure, as necessary. Thus a computer program residing on a physically separated computer, a remote server, or the like, may be used to perform the nonlinear regression analysis in accord with the embodiments, such use falling within the scope of the disclosure.

Figure 2:
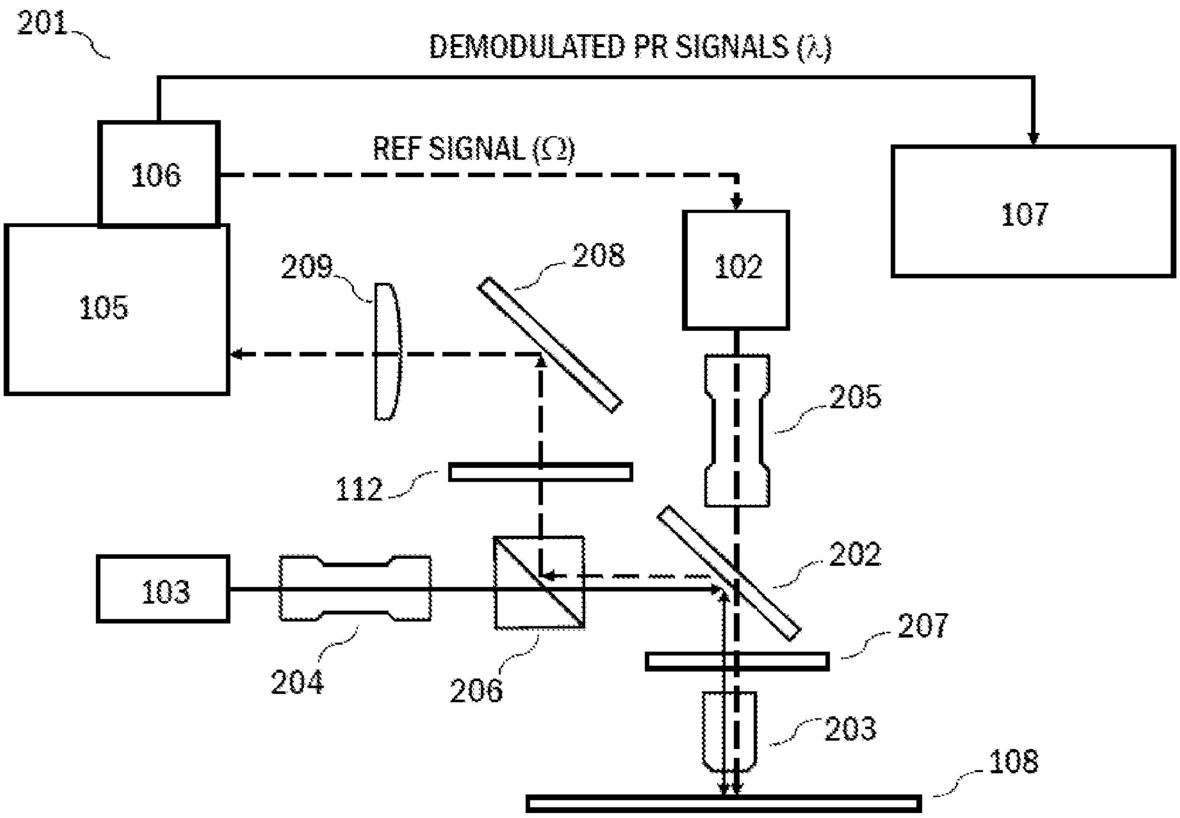
FIG. 2 illustrates an exemplary optical arrangement of a spectroscopic photo-reflectometer that may be used to provide photoreflectance spectroscopy using parallel demodulation, in accordance with certain embodiments of the invention.

The embodied techniques of the present disclosure may be accomplished using a variety of optical arrangements, elements, or focal geometries, including, for example, focusing the both the pump and probe beams onto the sample at normal incidence. For example, as shown in FIG. 2, an optical arrangement 201 that may be used to perform photoreflectance spectroscopy using parallel demodulation in accordance with the present invention comprises a pump laser source 102, a broad-spectrum probe light source 103, a dichroic beamsplitter 202, a reflective microscope objective 203, a probe beam telescope 204, a pump beam telescope 205, a broadband polarizing beamsplitter 206, an achromatic quarter wave plate 207, a notch filter 112, a metal mirror 208, a collection lens 209, a wavelength dispersing spectrometer 105, a lock-in camera 106, and a computer 107. The pump and probe beams (from the pump laser 102 and probe laser 103, respectively) are made collinear through the use of the dichroic beamsplitter 202 and co-focused to a spot on a semiconductor sample 108 using the microscope objective 203. As the pump radiation interacts with the sample 108, the sample 108 obtains a reflectance modulation, which results in changes in amplitude of the reflected probe light. The sample 108 reflects the incident probe beam back through the microscope objective 203. The polarizing beamsplitter 206, operating in conjunction with the quarter wave plate 207, is used to switch the reflected probe beam out of the incoming probe beam path. Scattered light from the pump beam and/or any photo-luminescence signal is spectrally filtered using the notch filter 112 and the reflected probe beam is transmitted to the spectrometer 105 using the metal mirror 208 and the collection lens 209. The spectrometer 105 disperses the reflected probe light into its constituent wavelengths and projects these wavelengths onto the lock-in camera 106 fixtured at the spectrometer exit. Each pixel of the lock-in camera 106 produces an electrical signal corresponding to the reflected probe light intensity (at the wavelength corresponding to the pixel position). The lock-in camera 106 further comprises a demodulation circuit for each photosensor element. Each demodulation circuit outputs a signal corresponding to the mixed and low-pass filtered photoreflectance signal at the wavelength corresponding to the photosensor position. The demodulated signals are transmitted to the computer 107, which records the photoreflectance signal as function of wavelength.

As previously discussed, the computer 107 may perform a fit to the photoreflectance data using standard nonlinear regression techniques to determine the interband transition energies, amplitudes, widths, etc. of semiconductor material within the sample 108. Thus, the systems and methods for photoreflectance spectroscopy using parallel demodulation disclosed herein enable the rapid evaluation of the material and/or electronic properties of semiconductor samples.

In the foregoing, therefore, the invention has been described with reference to specific embodiments. Although certain operations and elements for operation are disclosed, numerous other steps, operations, similar elements, processes and methods, as well as suitable modifications and equivalents may be resorted to, all falling within the scope of the disclosure. Accordingly, the specification and figures are to be regarded in an illustrative rather than a restrictive sense, and all such modifications substitutions, deletions, and additions are intended to be included within the scope of the invention.

The disclosures of all patents, patent applications, and publications cited herein are hereby incorporated herein by reference in their entirety, to the extent that they provide exemplary, procedural, or other details supplementary to those set forth herein.

What is claimed is:

1. An apparatus for acquiring spectroscopic photoreflectance data, comprising:

(a) a pump laser source operable to provide an intensity modulated pump laser beam suitable for inducing time periodic changes in the reflectance of a sample;

(b) a broad-spectrum probe light source operable to provide a spectroscopic probe light beam suitable for detecting pump induced changes in the reflectance of the sample;

(c) an optical system operable to direct the pump laser beam and the spectroscopic probe light beam onto the sample, and to collect and direct reflected probe light into a spectrometer operable to receive the reflected probe light and to disperse the reflected probe light into its constituent wavelengths at the spectrometer exit;

(d) a lock-in camera fixtured at the spectrometer exit operable to generate an electrical signal proportional to the reflected probe light intensity at each camera pixel, wherein each pixel comprises a demodulation circuit operable to output a demodulated signal corresponding to time periodic changes in the reflected probe light intensity; and (e) a computer operable to receive and record a plurality of demodulated output signals, said plurality comprising spectroscopic photoreflectance data.

2. The apparatus of claim 1, wherein the broad-spectrum probe light source comprises a laser driven light source.

3. The apparatus of claim 1, further comprising a computer program, embodied on a non-transitory computer readable medium, comprising executable code to perform a nonlinear regression analysis using spectroscopic photoreflectance data to determine at least one material or electronic property of the sample.

4. An apparatus for acquiring spectroscopic photoreflectance data, comprising:

(a) a pump laser source operable to provide an intensity modulated pump laser beam suitable for inducing time periodic changes in the reflectance of a sample;

(b) a broad-spectrum probe light source operable to provide a spectroscopic probe light beam suitable for detecting pump induced changes in the reflectance of the sample;

(c) an optical system operable to direct the pump laser beam and the spectroscopic probe light beam onto the sample, and to collect and direct reflected probe light into a spectrometer operable to receive the reflected probe light and to disperse the reflected probe light into its constituent wavelengths at the spectrometer exit;

(d) a photosensor array fixtured at the spectrometer exit operable to generate an electrical signal proportional to the reflected probe light intensity at each photosensor element;

(e) a multichannel lock-in amplifier operable to output a plurality of demodulated signals corresponding to time periodic changes in the reflected probe light intensity at each photosensor element; and (f) a computer operable to receive and record the plurality of demodulated output signals, said plurality comprising spectroscopic photoreflectance data.

5. The apparatus of claim 4, wherein the broad-spectrum probe light source comprises a laser driven light source.

6. The apparatus of claim 4, wherein the photosensor array comprises an avalanche photodiode array.

7. The apparatus of claim 4, wherein the multichannel lock-in amplifier comprises a field programmable gate array.

8. The apparatus of claim 4, further comprising a computer program, embodied on a non-transitory computer readable medium, comprising executable code to perform a nonlinear regression analysis using spectroscopic photoreflectance data to determine at least one material or electronic property of the sample.

9. A method of acquiring spectroscopic photoreflectance data, the method comprising the steps of:

(a) directing an intensity modulated pump laser beam onto a surface of a sample to produce a time periodic modulation of the reflectance of the sample;

(b) directing a spectroscopic probe light beam onto at least a portion of an area obtaining the time periodic modulation of the reflectance, wherein the probe light beam comprises at least one wavelength suitable for detecting the induced changes in the reflectivity of the sample;

(c) collecting a spectroscopic probe light reflected from the sample and dispersing it into its constituent wavelengths;

(d) directing a dispersed probe light onto a photosensor array to produce a plurality of electrical signals corresponding to changes in reflected probe light intensity as a function of wavelength;

(e) demodulating the plurality of electrical signals using a plurality of demodulation circuits, wherein each demodulation circuit is communicatively connected to an individual photosensor element of the photosensor array, to produce a plurality of demodulated signals, said plurality of demodulated signals comprising spectroscopic photoreflectance data; and (f) recording the spectroscopic photoreflectance data.

10. The method of claim 9, wherein the spectroscopic probe light beam is generated from a laser driven light source.

11. The method of claim 9, wherein the photosensor array comprises a plurality of integrated demodulation circuits, wherein each demodulation circuit is communicatively connected to an individual photosensor element of the photosensor array.

12. The method of claim 9, wherein the photosensor array comprises a lock-in camera.

13. The method of claim 9, wherein the photosensor array comprises an avalanche photodiode array.

14. The method of claim 9, wherein the step of demodulating the plurality of electrical signals is performed by a multichannel lock-in amplifier.

15. The method of claim 9, further comprising:

performing a nonlinear regression analysis using the recorded spectroscopic photoreflectance data to determine at least one material or electronic property of the sample.

* * * * *